(12) United States Patent
Katsuki et al.

(10) Patent No.: US 9,174,170 B2
(45) Date of Patent: Nov. 3, 2015

(54) EXHAUST GAS TREATING CATALYST AND EXHAUST GAS PURIFICATION APPARATUS USING THE SAME

(75) Inventors: Masatoshi Katsuki, Yokohama (JP); Shuuji Fujii, Yokohama (JP); Atsushi Ueda, Ikeda (JP); Yusuke Yamada, Ikeda (JP)

(73) Assignees: MITSUBISHI HEAVY INDUSTRIES, LTD., Tokyo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 13/126,965

(22) PCT Filed: Apr. 28, 2009

(86) PCT No.: PCT/JP2009/058331
§ 371 (c)(1),
(2), (4) Date: Jul. 15, 2011

(87) PCT Pub. No.: WO2010/050257
PCT Pub. Date: May 6, 2010

(65) Prior Publication Data
US 2012/0014841 A1 Jan. 19, 2012

(30) Foreign Application Priority Data
Oct. 31, 2008 (JP) .................. 2008-280727

(51) Int. Cl.
*B01J 23/40* (2006.01)
*B01D 53/94* (2006.01)
(Continued)

(52) U.S. Cl.
CPC ........ *B01D 53/9477* (2013.01); *B01D 53/9422* (2013.01); *B01J 23/002* (2013.01); *B01J 23/898* (2013.01); *F01N 13/009* (2014.06); *B01D 2255/1023* (2013.01); *B01D 2255/207* (2013.01); *B01D 2255/2042* (2013.01); *B01D 2255/2063* (2013.01);
(Continued)

(58) Field of Classification Search
None
See application file for complete search history.

(56) References Cited

U.S. PATENT DOCUMENTS 4,934,142 A  6/1990  Hayashi et al.
5,380,692 A  1/1995  Nakatsuji et al.
(Continued)

FOREIGN PATENT DOCUMENTS

EP  1118375 A2  7/2001
JP  63-302950  * 12/1988
(Continued)

OTHER PUBLICATIONS

Russian Office Action dated Feb. 24, 2012 with English Translation.
(Continued)

*Primary Examiner* — Melvin C Mayes
*Assistant Examiner* — Colette Nguyen
(74) *Attorney, Agent, or Firm* — Birch, Stewart, Kolasch & Birch, LLP

(57) ABSTRACT

An exhaust gas treating catalyst further improved in denitrification performance is provided. It is an exhaust gas treating catalyst containing a complex oxide represented by the general formula $ABO_3$, where the A-site is composed of a lanthanoid (La) and barium (Ba), and the B-site is composed of iron (Fe), niobium (Nb) and palladium (Pd).

6 Claims, 5 Drawing Sheets

(51) Int. Cl.
*B01J 23/00* (2006.01)
*B01J 23/89* (2006.01)
*F01N 13/00* (2010.01)

(52) U.S. Cl.
CPC ............ *B01D 2255/20738* (2013.01); *B01D 2255/402* (2013.01); *B01D 2258/012* (2013.01); *B01J 2523/00* (2013.01)

(56) References Cited

U.S. PATENT DOCUMENTS

| | | | | |
|---|---|---|---|---|
| 5,877,377 | A * | 3/1999 | Golunski et al. | 585/624 |
| 2001/0016554 | A1* | 8/2001 | Takeuchi | 502/303 |
| 2006/0018815 | A1* | 1/2006 | Suda | 423/263 |
| 2007/0100190 | A1* | 5/2007 | Cimino et al. | 585/658 |
| 2009/0023580 | A1* | 1/2009 | Tanaka et al. | 502/171 |

FOREIGN PATENT DOCUMENTS

| | | |
|---|---|---|
| JP | 63-302950 A | 12/1988 |
| JP | 1-159029 A | 6/1989 |
| JP | 5-76762 A | 3/1993 |
| JP | 5076762 * | 3/1993 |
| JP | 5-184930 A | 7/1993 |
| JP | 5-187230 A | 7/1993 |
| JP | 2001-269578 A | 10/2001 |
| JP | 2006-205021 A | 8/2006 |
| JP | 2006-346602 A | 12/2006 |
| JP | 2008-12480 A | 1/2008 |
| JP | 2008-215093 A | 9/2008 |
| JP | 2008-238012 A | 10/2008 |
| JP | 2009-125736 A | 6/2009 |
| RU | 816391 A3 | 3/1981 |
| WO | WO 2004/073856 A1 | 9/2004 |
| WO | WO 2007/115380 A1 | 10/2007 |

OTHER PUBLICATIONS

Cheng, Y. et al. Investigation of Ba fully occupied A site BaCoo.7Fe0.3-x Nbx O3-0 perovskite stabilized by low concentration of Nb for oxygen permeation membrane, Journal of Membrane Science, Sep. 15, 2008, vol. 322, No. 2, p. 484-490.
Nishihata, Y. et al. Self-regeneration of a Pd-perovskite catalyst for automotive emissions control, Nature, Jul. 11, 2002, vol. 418, p. 164-167.
Ueda, A. et al. "Perovskite-gata Kinzoku Sankabutsu ni yoru NOx Kyuzo-Kangen Hanno", Shokubai Toronkai Toronkai A Yokoshu, Sep. 23, 2008, vol. 102, p. 140.
Ueda, A. et al., "LaFeO3-gata Perovskite ni yoru NOx Kyuzo=Kangen Hanno", Shokubai Toronkai Toronkai A Yokoshu, Mar. 30, 2009, vol. 103, p. 59.
Japanese Decision to Grant a Patent issued in Japanese Patent Application. No. 2008-280727 on Sep. 3, 2013.
European Search Report, dated Sep. 10, 2014, for European Application No. 09823370.3.

* cited by examiner

Comparative Test Catalyst 2 : 0
Test Catalyst 2 : 0.1wt%Pt+0.01wt%Rh
Test Catalyst 3 : 0.2wt%Pt+0.02wt%Rh
Test Catalyst 4 : 0.4wt%Pt+0.04wt%Rh

EXHAUST GAS TREATING CATALYST AND EXHAUST GAS PURIFICATION APPARATUS USING THE SAME

BACKGROUND OF THE INVENTION

1. Field of the Invention

This invention relates to an exhaust gas treating catalyst and an exhaust gas purification apparatus using it. More particularly, the invention relates to an exhaust gas treating catalyst which is effective when used in removing nitrogen oxides, hydrocarbons, and carbon monoxide in an exhaust gas discharged from a diesel engine or the like; and an exhaust gas purification apparatus using the exhaust gas treating catalyst.

2. Description of the Related Art

Exhaust gas treating catalysts for removing nitrogen oxides in an exhaust gas discharged from a diesel engine or the like include, for example, those having a carrier coated on a honeycomb-shaped substrate, the carrier supporting a precious metal and an occluding or storage material for occluding or storing $NO_x$. Examples of the precious metal are platinum, rhodium, and palladium. Examples of the storage material are alkali metals such as potassium, and alkaline earth metals such as barium. Examples of the carrier are alumina, ceria, zirconia, and titania.

Nitrogen oxides in the exhaust gas are removed by installing such an exhaust gas treating catalyst in an exhaust pipe of a diesel engine or the like. That is, when the exhaust gas is in a lean state (a state where the oxygen concentration is high (3% or more)), NO and oxygen react on the precious metal to form $NO_x$, and this $NO_x$ is occluded or stored in the storage material.

Another practice is to spray the exhaust gas treating catalyst with an organic compound or a fuel, which will serve as a reducing agent, or increase the injection volume of the fuel in the engine, thereby creating a reducing atmosphere with the exhaust gas in a rich state (a state where the oxygen concentration is low). By so doing, $NO_x$ stored in the storage material migrates onto the precious metal. This $NO_x$, hydrocarbons and CO react to generate water, nitrogen and carbon dioxide, and these substances are discharged. With the exhaust gas treating catalyst, therefore, the storage of nitrogen oxides and the discharge of the stored nitrogen oxides as nitrogen (regeneration of the catalyst) are performed repeatedly.

However, the basic metal (alkali metal, alkaline earth metal) as the above-mentioned storage material is poisoned by the sulfur content in the fuel to decrease in storage performance for the nitrogen oxides. The sulfur-poisoned storage material is exposed to a reducing atmosphere at a high temperature, say, a temperature of 650° C. or higher, to desorb and remove sulfur. The reducing atmosphere can be created, for example, by the injection of fuel or the elevation of the exhaust gas temperature, but such an operation worsens fuel economy. Also, the exposure of the catalyst to the high temperature causes heat deterioration. Moreover, the active metal is sintered, so that the performance of the exhaust gas treating catalyst degrades. Furthermore, if a diesel particulate filter (DPF) for removing particulate matter (PM) contained in the exhaust gas is installed in the exhaust pipe, PM trapped by the DPF is burned off, thereby increasing the chances of the exhaust gas treating catalyst being exposed to high temperatures.

Among denitrification catalysts such as $NO_x$ storage catalysts, various perovskite-type catalysts, namely, so-called complex oxide-containing exhaust gas treating catalysts, have been developed as the catalysts having high resistance to sulfur and high resistance to heat (see, for example, Patent Document 1).

PRIOR ART DOCUMENTS

Patent Document

Patent Document 1: JP-A-2006-346602

SUMMARY OF THE INVENTION

Problems to be Solved by the Invention

The above-described exhaust gas treating catalyst containing the complex oxide can remove nitrogen oxides contained in the exhaust gas, but a further improvement in the denitrification performance of the exhaust gas treating catalyst has been desired.

The present invention has been proposed in the light of the problems mentioned above. It is an object of the present invention to provide an exhaust gas treating catalyst further improved in denitrification performance, and an exhaust gas purification apparatus using it.

Means for Solving the Problems

An exhaust gas treating catalyst according to a first aspect of the invention for solving the above problems is an exhaust gas treating catalyst containing a complex oxide represented by the general formula $ABO_3$, where the A-site is composed of a lanthanoid (La) and barium (Ba), and the B-site is composed of iron (Fe), niobium (Nb) and palladium (Pd).

An exhaust gas treating catalyst according to a second aspect of the invention for solving the above problems is the exhaust gas treating catalyst according to the first aspect of the invention, which fulfills $\{La_xBa_{(1-x)}\}\{Fe_yNb_{(1-x)}\}_{(1-z)}Pd_zO_3$ where x is in the range of more than 0.30, but 0.95 or less, y is in the range of 0.07 or more, but 0.94 or less, and z is in the range of 0.01 or more, but 0.10 or less.

An exhaust gas treating catalyst according to a third aspect of the invention for solving the above problems is the exhaust gas treating catalyst according to the first aspect of the invention, which fulfills $\{La_xBa_{(1-x)}\}\{Fe_yNb_{(1-x)}\}_{(1-z)}Pd_zO_3$ where x is in the range of more than 0.60, but less than 0.80, y is in the range of 0.63 or more, but 0.88 or less, and z is in the range of 0.02 or more, but 0.04 or less.

An exhaust gas treating catalyst according to a fourth aspect of the invention for solving the above problems is the exhaust gas treating catalyst according to any one of the first to third aspects of the invention, further containing at least one precious metal among Pt, Rh, Ir and Ru.

An exhaust gas treating catalyst according to a fifth aspect of the invention for solving the above problems is the exhaust gas treating catalyst according to the fourth aspect of the invention, wherein the precious metal is contained in an amount of 0.1 wt. % or more based on the complex oxide.

An exhaust gas purification apparatus according to a sixth aspect of the invention for solving the above problems is an exhaust gas purification apparatus for reducing nitrogen oxides in an exhaust gas to purify the exhaust gas, the apparatus comprising a trapping means for trapping particulate matter in the exhaust gas, and the exhaust gas treating catalyst according to any one of the first to third aspects of the invention, the exhaust gas treating catalyst being disposed downstream of the trapping means in the flow-through direction of the exhaust gas.

An exhaust gas purification apparatus according to a seventh aspect of the invention for solving the above problems is an exhaust gas purification apparatus for reducing nitrogen oxides in an exhaust gas to purify the exhaust gas, the apparatus comprising a trapping means for trapping particulate matter in the exhaust gas, and the exhaust gas treating catalyst according to the fourth aspect of the invention, the exhaust gas treating catalyst being disposed downstream of the trapping means in the flow-through direction of the exhaust gas.

An exhaust gas purification apparatus according to an eighth aspect of the invention for solving the above problems is an exhaust gas purification apparatus for reducing nitrogen oxides in an exhaust gas to purify the exhaust gas, the apparatus comprising a trapping means for trapping particulate matter in the exhaust gas, and the exhaust gas treating catalyst according to the fifth aspect of the invention, the exhaust gas treating catalyst being disposed downstream of the trapping means in the flow-through direction of the exhaust gas.

An exhaust gas purification apparatus according to a ninth aspect of the invention for solving the above problems is the exhaust gas purification apparatus according to the sixth aspect of the invention, further comprising an oxidation catalyst for oxidizing unburned hydrocarbons, carbon monoxide, nitrogen oxides, and a black smoke carbon component in the exhaust gas, the oxidation catalyst being disposed upstream of the trapping means in the flow-through direction of the exhaust gas.

An exhaust gas purification apparatus according to a tenth aspect of the invention for solving the above problems is the exhaust gas purification apparatus according to the seventh aspect of the invention, further comprising an oxidation catalyst for oxidizing unburned hydrocarbons, carbon monoxide, nitrogen oxides, and a black smoke carbon component in the exhaust gas, the oxidation catalyst being disposed upstream of the trapping means in the flow-through direction of the exhaust gas.

An exhaust gas purification apparatus according to an eleventh aspect of the invention for solving the above problems is the exhaust gas purification apparatus according to the eighth aspect of the invention, further comprising an oxidation catalyst for oxidizing unburned hydrocarbons, carbon monoxide, nitrogen oxides, and a black smoke carbon component in the exhaust gas, the oxidation catalyst being disposed upstream of the trapping means in the flow-through direction of the exhaust gas.

Effects of the Invention

The exhaust gas treating catalyst according to the first aspect of the invention is the exhaust gas treating catalyst containing a complex oxide represented by the general formula $ABO_3$, where the A-site is composed of a lanthanoid (La) and barium (Ba), and the B-site is composed of iron (Fe), niobium (Nb) and palladium (Pd). Thus, barium functions as a $NO_x$ storing agent, and niobium acts on palladium to accelerate NO oxidation and $NO_x$ reduction. Hence, this exhaust gas treating catalyst increases the denitrification rate as compared with an exhaust gas treating catalyst containing $LaFe_{0.95}Pd_{0.05}O_3$ which is a conventional complex oxide.

The exhaust gas treating catalysts according to the second and third aspects of the invention exhibit the same actions and effects as those of the exhaust gas treating catalyst according to the first aspect of the invention.

The exhaust gas treating catalysts according to the fourth and fifth aspects of the invention can show denitrification performance comparable to that of an exhaust gas treating catalyst, which does not contain at least one precious metal among Pt, Rh, Ir and Ru, over the exhaust gas temperature range of 250 to 400° C. Furthermore, the exhaust gas treating catalysts according to the fourth and fifth aspects of the invention can exhibit denitrification performance comparable to that shown when the temperature of the exhaust gas is 250° C. even if the temperature of the exhaust gas is 200° C.

With the exhaust gas purification apparatuses according to the sixth, seventh and eighth aspects of the invention, the exhaust gas treating catalyst can show denitrification performance of the order of 40%, even in the temperature range of 200 to 300° C. Thus, the exhaust gas treating catalyst can be disposed downstream of the trapping means in the flow-through direction of the exhaust gas. Consequently, the particulate matter in the exhaust gas can be trapped and removed by the trapping means, the aged deterioration of the exhaust gas treating catalyst due to the deposition of the particulate matter can be suppressed, and an increase in the operating cost can be curtailed. Furthermore, the amount of the exhaust gas treating catalyst disposed can be decreased, and the apparatus can be rendered compact.

The exhaust gas purification apparatuses according to the ninth, tenth and eleventh aspects of the invention further comprise an oxidation catalyst for oxidizing unburned hydrocarbons, carbon monoxide, nitrogen oxides, and a black smoke carbon component in the exhaust gas, the oxidation catalyst being disposed upstream of the trapping means in the flow-through direction of the exhaust gas. Consequently, these exhaust gas purification apparatuses exhibit the same actions and effects as those of the exhaust gas purification apparatuses according to the sixth, seventh and eighth aspects of the invention. Besides, unburned hydrocarbons, carbon monoxide, nitrogen oxides, and a black smoke carbon component in the exhaust gas are oxidized by the oxidation catalyst on the upstream side of the exhaust gas treating catalyst in the flow-through direction of the exhaust gas. Thus, nitrogen oxides can be purified by the exhaust gas treating catalyst with high efficiency.

DETAILED DESCRIPTION OF THE INVENTION

Embodiments of an exhaust gas treating catalyst according to the present invention, and an exhaust gas purification apparatus using the exhaust gas treating catalyst will be described below.

[First Embodiment]

An exhaust gas treating catalyst according to a first embodiment, and an exhaust gas purification apparatus using the exhaust gas treating catalyst will be described by reference to FIG. 1.

Figure 1:
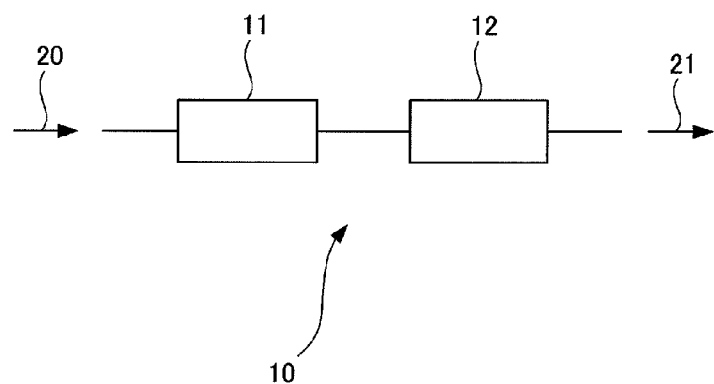
FIG. 1 is a schematic configuration drawing of a first embodiment of an exhaust gas purification apparatus using an exhaust gas treating catalyst according to the present invention.

FIG. 1 is a schematic configuration drawing of the first embodiment of the exhaust gas purification apparatus using the exhaust gas treating catalyst.

An exhaust gas purification apparatus 10 according to the present embodiment has a diesel particulate filter (DPF) 11 which is a trapping means for trapping particulate matter, and an exhaust gas treating catalyst 12, as shown in FIG. 1. With the exhaust gas purification apparatus 10, an exhaust gas 20 is introduced into the DPF 11, where the particulate matter (PM) in the exhaust gas 20 is trapped, whereby the PM is removed from the exhaust gas 20. The exhaust gas freed of the PM is introduced into the exhaust gas treating catalyst 12, and nitrogen oxides in the exhaust gas are purified by the exhaust gas treating catalyst 12 and discharged as exhaust gas 21. That is, in the exhaust gas purification apparatus 10, the DPF 11 and the exhaust gas treating catalyst 12 are arranged in this order from the upstream side in the flow-through direction of the exhaust gas.

As the above-mentioned exhaust gas treating catalyst 12, there can be used a catalyst containing a complex oxide composed of a perovskite-type catalyst for reducing the nitrogen oxides in the exhaust gas to nitrogen, thereby purifying the exhaust gas. Concretely, a catalyst represented by the following general formula (1) can be used as the exhaust gas treating catalyst 12.

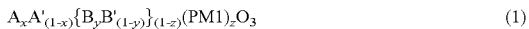

$$A_xA'_{(1-x)}\{B_yB'_{(1-y)}\}_{(1-z)}(PM1)_zO_3 \quad (1)$$

where the A component is lanthanum (La), the A' component is barium (Ba), the B component is iron (Fe), the B' component is niobium (Nb), and PM1 (precious metal) is palladium (Pd).

As the above-mentioned exhaust gas treating catalyst 12, use can be made of the catalyst represented by the aforementioned general formula (1), and a catalyst obtained by further supporting a precious metal on the catalyst represented by the general formula (1), the precious metal being different from the precious metal constituting the complex oxide. Concretely, a catalyst represented by the following general formula (2) can be used as the exhaust gas treating catalyst 12.

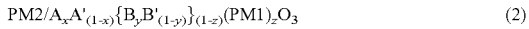

$$PM2/A_xA'_{(1-x)}\{B_yB'_{(1-y)}\}_{(1-z)}(PM1)_zO_3 \quad (2)$$

where the A component is lanthanum (La), the A' component is barium (Ba), the B component is iron (Fe), the B' component is niobium (Nb), PM1 (precious metal) is palladium (Pd), and PM2 (precious metal) is at least one of platinum (Pt), rhodium (Rh), iridium (Ir) and ruthenium (Ru).

In the above general formulas (1) and (2), the aforementioned x is in the range of more than 0.30, but 0.95 or less, and preferably, x is in the range of more than 0.60, but less than 0.80. In other words, the content of barium is 0.05 mol or more, but less than 0.70 mol, and preferably, exceeds 0.20 mol, but less than 0.40 mol. When the content of barium is more than 0.05 mol, the effect of storing $NO_x$ can be exhibited. If the content of barium is 0.70 mol or more, on the other hand, the perovskite-type catalyst of the general formula $ABO_3$ will collapse.

The aforementioned y is in the range of 0.07 or more, but 0.94 or less, and preferably, is in the range of 0.63 or more, but 0.88 or less. In other words, the content of niobium is 0.05 mol or more, but 0.80 mol or less, and preferably, is in the range of 0.10 mol or more, but 0.30 mol or less. If the content of niobium is less than 0.05 mol, the acceleration of the reaction between stored $NO_x$ and CO by its action on palladium does not take place any more. If the content of niobium is more than 0.80 mol, on the other hand, the perovskite-type catalyst of the general formula $ABO_3$ will collapse.

The aforementioned z is in the range of 0.01 mol or more, but 0.10 mol or less, preferably, in the range of 0.02 mol or more, but 0.04 mol or less. If the content of palladium falls short of 0.01 mol, the effect ascribed to the incorporation of the precious metal cannot be exhibited. If the content of palladium exceeds 0.10 mol, on the other hand, the cost advantage will be reduced.

Since the exhaust gas treating catalyst 12 is the catalyst of the aforementioned general formula (1) or the catalyst of the aforementioned general formula (2), it can show denitrification performance of the order of 40% even in the temperature range of 200 to 300° C. (a concrete example will be described later).

[Method for Preparation of Exhaust Gas Treating Catalyst]

The following two processes (liquid phase process and solid phase process) are named as the method for preparation of the above-mentioned exhaust gas treating catalyst 12, but they are not limitative.

<Liquid Phase Process>

With this process, metal salt solutions containing La, Ba, Fe and Pd, and an aqueous solution of an organic acid (an aqueous solution of acetic acid, oxalic acid, or amino acid, an aqueous solution of hydrogen peroxide containing niobium-dioxide, or an aqueous solution from niobium hydrogenoxalate as a starting source) containing the aforementioned Nb component are used as the starting materials. However, the above-mentioned starting materials are prepared as aqueous solutions at arbitrary concentrations before the preparation process described below.

[Preparation of Hydrogen Peroxide Aqueous Solution of Niobium Dioxide]

The above-mentioned hydrogen peroxide aqueous solution of niobium dioxide is prepared, for example, in the following manner:

Niobium chloride ($NbCl_5$; 5 g) is dissolved in dilute aqueous ammonia (50 mL water+4 mL ammonia water (28%)), and the solution is stirred for 30 minutes at room temperature. A white precipitate which has precipitated is collected by filtration, and washed with water. After washing with water, the water-washed filter cake is immediately added to a solution mixture of an aqueous solution of hydrogen peroxide (35% aqueous solution 25 mL+water 25 mL) and ammonia water (28%, 6 mL), and the mixture is stirred to obtain a colorless solution. The colorless solution is added to 100 mL of acetone, and the resulting white sediment is collected by filtration. The filtered-off white sediment is dissolved in a 3.5% aqueous solution of hydrogen peroxide to obtain a 3.5% hydrogen peroxide aqueous solution of niobium dioxide.

<Procedure for Preparation>

(1) First of all, the above-mentioned metal salt solutions and an organic compound such as an aqueous solution of an organic acid are weighed to have a predetermined element ratio.

(2) Then, the weighed metal salt aqueous solutions are added into a reactor, and mixed together. Hereinafter, the resulting liquid is referred to as a mixed liquid.

(3) Then, the above-mentioned organic acid aqueous solution is gradually added, with the mixed liquid being stirred, and the system is stirred until its total amount is dissolved.

(4) Then, water is evaporated in an evaporator to concentrate the system.

(5) Then, the concentrate is placed in a dryer, and dried, with an atmosphere in this machine being set at 250° C., until it becomes powdery.

(6) Then, the powder is ground in a mortar, and then fired for 5 hours at 600 to 1200° C. to obtain an exhaust gas treating catalyst (a catalyst represented by the general formula (1)).

(7) A precious metal is supported on the exhaust gas treating catalyst obtained in (6) above. For example, the exhaust gas treating catalyst obtained in the above (6) is impregnated with an organic acid aqueous solution having the precious metal dissolved therein to obtain an exhaust gas treating catalyst carrying the precious metal (a catalyst represented by the aforementioned general formula (2)).

<Solid Phase Process>

With this process, oxides or carbonates containing La, Ba, Fe, Nb and Pd which are starting materials, a dispersing agent, and various solvents ($H_2O$, ethanol, methanol, etc.) are used. However, the above starting materials are placed in a dryer having an internal atmosphere at 120° C. before the following preparation process, and thoroughly dried there.

<Procedure for Preparation>

(I) First of all, various starting materials (dried at 120° C.), a dispersing agent, and a solvent are weighed (the amount of the dispersing agent is 5 wt. % based on the weight of the powdery materials, and the amount of the solvent is the same as the amount of the starting powders).

(II) Then, the weighed starting materials, dispersing agent and solvent, as well as grinding balls are placed in a container.

(III) Then, these materials are ground, stirred, and mixed by means of a ball mill.

(IV) Then, water is evaporated in an evaporator to concentrate the system.

(V) Then, the concentrate is placed in a dryer, and dried, with an atmosphere in this machine being set at 120° C., until it becomes powdery.

(VI) Then, the powder is ground in a mortar, and then fired for 5 hours at 800 to 1200° C. to obtain an exhaust gas treating catalyst (a catalyst represented by the aforementioned general formula (1)).

(VII) A precious metal is supported on the exhaust gas treating catalyst obtained in (VI) above. For example, the exhaust gas treating catalyst obtained in the above (VI) is impregnated with an organic acid aqueous solution having the precious metal dissolved therein to obtain an exhaust gas treating catalyst carrying the precious metal (a catalyst represented by the aforementioned general formula (2)).

A precious metal including at least one of platinum (Pt), rhodium (Rh), iridium (Ir) and ruthenium (Ru) is particularly effective as the precious metal used in (7) of the above-described procedure for preparation by the liquid phase process and in (VII) of the above-described procedure for preparation by the solid phase process. The content of this precious metal is preferably 0.1 to 5 wt. % based on the complex oxide (the exhaust gas treating catalyst obtained in the above (6) or (VI)). If the content of the precious metal is less than 0.1 wt %, denitrification performance exhibited is merely equal to that obtained when the exhaust gas treating catalyst is free of the precious metal. Even if the content is more than 5 wt. %, denitrification performance levels off and does not improve any more.

With the above-described exhaust gas purification apparatus 10, a fuel injection nozzle (fuel injection means) (not shown) is disposed upstream of the DPF 11 in the flow-through direction of the exhaust gas. A fuel, as a reducing agent, is jetted from the fuel injection nozzle periodically, for example, for only 4 seconds per minute, and supplied to the exhaust gas treating catalyst 12. As a result, the oxygen concentration in the exhaust gas 21 lowers, and nitrogen oxides stored in the exhaust gas treating catalyst 12 are reduced and can be discharged as nitrogen. The fuel injection means is not limited to that installed in the exhaust pipe, and may be by post-injection or the like in the internal combustion engine. The reducing agent is not limited to a hydrocarbon or carbon monoxide produced from the fuel, but includes hydrogen, etc. generated by fuel reforming or water electrolysis. When the DPF 11 traps PM in the exhaust gas and collects its predetermined amount, injection by the fuel injection nozzle, or post-injection, which is subsidiary injection after main injection within the cylinder in the internal combustion engine, is carried out. By this measure, the exhaust gas temperature is raised to a high temperature to burn off the PM trapped by the DPF 11.

According to the exhaust gas purification apparatus 10 concerned with the present embodiment, therefore, the exhaust gas treating catalyst 12 can exhibit denitrification performance of the order of 40% even in the temperature range of 200 to 300° C. Thus, the exhaust gas treating catalyst 12 can be disposed downstream of the DPF 11 in the flow-through direction of the exhaust gas. Because of this configuration, PM in the exhaust gas can be trapped and removed by the DPF 11 disposed upstream of the exhaust gas treating catalyst 12 in the flow-through direction of the exhaust gas, so that the aged deterioration of the exhaust gas treating catalyst 12 due to the deposition of PM or the like can be suppressed. Consequently, the life of the exhaust gas treating catalyst 12 itself can be prolonged, and an increase in the operating cost owing to maintenance such as the periodical replacement of the catalyst 12 can be curtailed. Furthermore, the amount of the exhaust gas treating catalyst 12 disposed can be decreased, and the compactness of the apparatus can be achieved.

[Second Embodiment]

An exhaust gas treating catalyst and an exhaust gas purification apparatus using the exhaust gas treating catalyst, according to a second embodiment, will be described by reference to FIG. 2.

Figure 2:
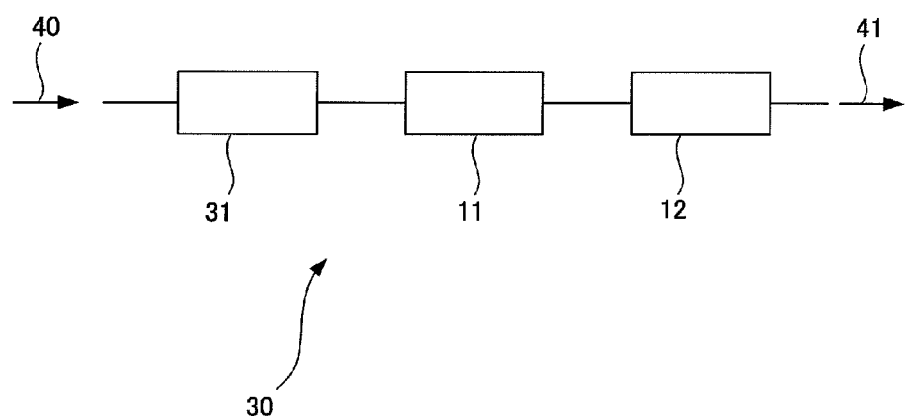
FIG. 2 is a schematic configuration drawing of a second embodiment of an exhaust gas purification apparatus using an exhaust gas treating catalyst according to the present invention.

FIG. 2 is a schematic configuration drawing of the second embodiment of the exhaust gas purification apparatus using the exhaust gas treating catalyst.

The exhaust gas purification apparatus according to the present embodiment has an oxidation catalyst disposed upstream of the DPF 11 in the aforementioned exhaust gas purification apparatus 10 and, except for this feature, is of the same configuration as that of the exhaust gas purification apparatus 10.

In the exhaust gas purification apparatus according to the present embodiment, the same instruments as the instruments provided in the above-mentioned exhaust gas purification apparatus 10 will be assigned the same numerals as those in the exhaust gas purification apparatus 10, and explanations for them will be omitted.

In an exhaust gas purification apparatus 30 according to the present embodiment, an oxidation catalyst 31, a DPF 11 and an exhaust gas treating catalyst 12 are arranged in this order from the upstream side in the flow-through direction of an exhaust gas 40 (and eventually discharged as exhaust gas 41), as shown in FIG. 2. The oxidation catalyst 31 oxidizes unburned hydrocarbons, carbon monoxide, nitrogen oxides, and a black smoke carbon component in the exhaust gas 40.

According to the exhaust gas purification apparatus 30 concerned with the present embodiment, therefore, unburned hydrocarbons, carbon monoxide, nitrogen oxides, and a black smoke carbon component in the exhaust gas are oxidized by the oxidation catalyst 31 on the side upstream of the exhaust gas treating catalyst 12 in the exhaust gas flow-through direction. Thus, the nitrogen oxides can be efficiently purified by the exhaust gas treating catalyst 12. In this manner, trapping and removal of PM in the exhaust gas can be performed reliably by the DPF 11 disposed upstream of the exhaust gas treating catalyst 12 in the exhaust gas flow-through direction, so that the aged deterioration of the exhaust gas treating catalyst 12 due to the deposition of PM or the like can be suppressed more reliably. Consequently, the life of the exhaust gas treating catalyst 12 itself can be prolonged, and an increase in the operating cost owing to maintenance such as the periodical replacement of the catalyst 12 can be curtailed. Furthermore, the amount of the exhaust gas treating catalyst 12 disposed can be decreased, and the compactness of the apparatus can be achieved.

EXAMPLE

Confirmatory tests conducted to confirm the effects of the exhaust gas treating catalyst according to the present invention will be described below. However, the present invention is not limited to the following confirmatory tests:

[First Confirmatory Test]

The present confirmatory test is a test conducted to confirm the relationship between the content of Ba in the exhaust gas treating catalyst and the denitrification rate by the exhaust gas treating catalyst.

The relationship between the content of Ba in the exhaust gas treating catalyst and the denitrification rate of the exhaust gas treating catalyst will be described concretely by reference to FIGS. 3 (a) and 3(b).

Figure 3A:
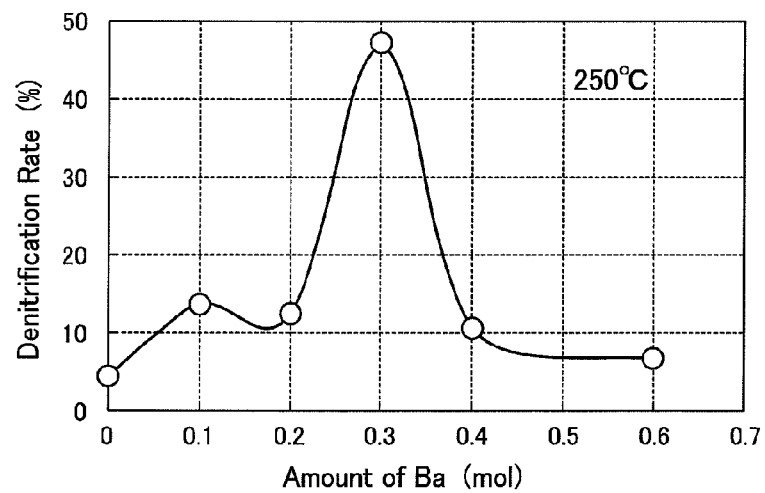
FIGS. 3(a) and 3(b) are graphs showing the relationship between the content of barium and the denitrification rate in the exhaust gas treating catalyst, FIG. 3(a) showing a case where the temperature of the exhaust gas was 250° C., and FIG. 3(b) showing a case where the temperature of the exhaust gas was 300° C.
Figure 3B:
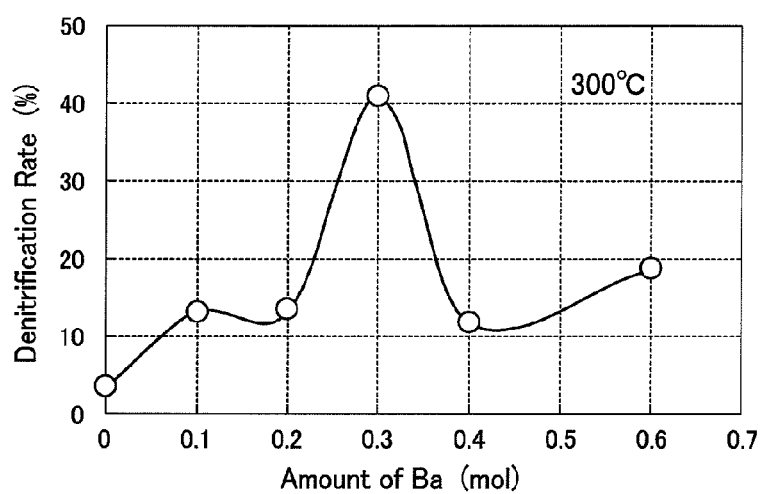

FIGS. 3 (a) and 3(b) are graphs showing the relationship between the content of barium and the denitrification rate in the exhaust gas treating catalyst, FIG. 3 (a) showing a case where the temperature of the exhaust gas was 250° C., and FIG. 3 (b) showing a case where the temperature of the exhaust gas was 300° C. In FIGS. 3 (a) and 3(b) the abscissa represents the amount of Ba (mol), and the ordinate represents the denitrification rate.

A conventional exhaust gas treating catalyst $LaFe_{0.95}Pd_{0.05}O_3$ (barium content: 0 mol), an exhaust gas treating catalyst $La_{0.9}Ba_{0.1}Fe_{0.776}Nb_{0.194}Pd_{0.03}O_3$ with a barium content of 0.1 mol, an exhaust gas treating catalyst $La_{0.8}Ba_{0.2}Fe_{0.776}Nb_{0.194}Pd_{0.03}O_3$ with a barium content of 0.2 mol, an exhaust gas treating catalyst $La_{0.7}Ba_{0.3}Fe_{0.776}Nb_{0.194}Pd_{0.03}O_3$ with a barium content of 0.3 mol, an exhaust gas treating catalyst $La_{0.6}Ba_{0.4}Fe_{0.776}Nb_{0.194}Pd_{0.03}O_3$ with a barium content of 0.4 mol, and an exhaust gas treating catalyst $La_{0.4}Ba_{0.6}Fe_{0.776}Nb_{0.194}Pd_{0.03}O_3$ with a barium content of 0.6 mol were each prepared by the aforementioned liquid phase process.

The exhaust gas was passed through each of the above-mentioned exhaust gas treating catalysts under the conditions shown in Table 1 below, and the denitrification performance of each catalyst was measured. In Table 1, SV denotes space velocity (flow rate of fluid/volume of catalyst), and Lean/Rich represents the ratio of the treatment time in the lean state/the treatment time in the rich state.

TABLE 1

| Evaluation Conditions | | |
|---|---|---|
| SV | | $40000\ h^{-1}$, 250° C., 300° C. |
| Lean Gas | NO | 500 ppm |
| (Base Gas: Ar) | CO | 300 ppm |
| | $CO_2$ | 6% |
| | $O_2$ | 10% |
| | $C_3H_6$ | 200 ppm |
| Rich Gas | NO | 500 ppm |
| (Base Gas: Ar) | CO | 4% |
| | $CO_2$ | 6% |
| | $O_2$ | 0% |
| | $C_3H_6$ | 200 ppm |
| Lean/Rich | | 56 seconds/4 seconds |

The results of the measurements are shown in FIGS. 3 (a) and 3(b).

In FIGS. 3 (a) and 3(b), the denitrification rate represents the average of the denitrification rate when the gas treated was in a lean state, and the denitrification rate when the gas treated was in a rich state.

When the exhaust gas temperature was 250° C., the exhaust gas treating catalyst $La_xBa_{(1-x)}Fe_{0.776}Nb_{0.194}Pd_{0.03}O_3$ with a Ba content (i.e., 1−x) in the range of 0.05 mol or more, but less than 0.7 mol, preferably in the range of more than 0.20 mol, but less than 0.40 mol, was found to increase the denitrification rate as compared with the exhaust gas treating catalyst $LaFe_{0.95}Pd_{0.05}O_3$ (Ba content: 0 mol), as shown in FIG. 3 (a). Particularly, in the barium content range of about 0.05 mol more than and less than 0.3 mol, the denitrification rate was higher than about 30%, with the denitrification rate peaking with 0.3 mol. Thus, the exhaust gas treating catalyst $La_xBa_{(1-x)}Fe_{0.776}Nb_{0.194}Pd_{0.03}O_3$ with the Ba content in the above range was found to provide a higher denitrification rate than the exhaust gas treating catalyst $LaFe_{0.95}Pd_{0.05}O_3$ (Ba content: 0 mol).

When the exhaust gas temperature was 300° C., on the other hand, the exhaust gas treating catalyst $La_xBa_{(1-x)}Fe_{0.776}Nb_{0.194}Pd_{0.03}O_3$ with a Ba content (i.e., 1−x) in the range of 0.05 mol or more, but less than 0.7 mol, preferably in the range of more than 0.20 mol, but less than 0.40 mol, was found to increase the denitrification rate as compared with the exhaust gas treating catalyst $LaFe_{0.95}Pd_{0.05}O_3$ (Ba content: 0 mol), as shown in FIG. 3 (b). Particularly, in the barium content range of about 0.05 mol more than and less than 0.3 mol, the denitrification rate was higher than about 20%, with the denitrification rate peaking with 0.3 mol. Thus, the exhaust gas treating catalyst $La_xBa_{(1-x)}Fe_{0.776}Nb_{0.194}Pd_{0.03}O_3$ with the Ba content in the above range was found to provide a higher denitrification rate than the exhaust gas treating catalyst $LaFe_{0.95}Pd_{0.05}O_3$ (Ba content: 0 mol).

[Second Confirmatory Test]

The present confirmatory test is a test conducted to confirm the relationship between the content of Nb in the exhaust gas treating catalyst and the denitrification rate by the exhaust gas treating catalyst.

The relationship between the content of Nb in the exhaust gas treating catalyst and the denitrification rate of the exhaust gas treating catalyst will be described concretely by reference to FIGS. 4(a) and 4(b).

Figure 4A:
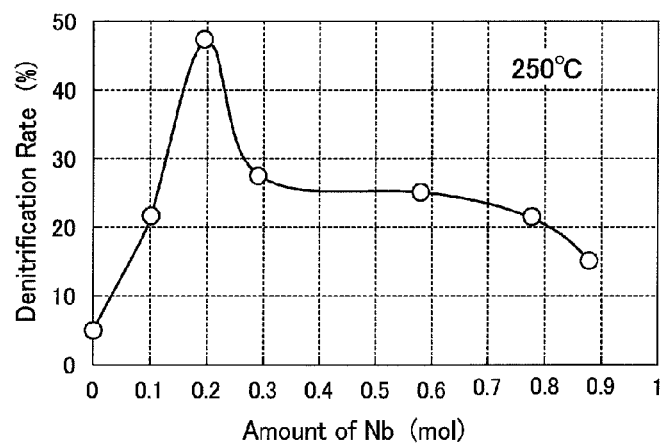
FIGS. 4(a) and 4(b) are graphs showing the relationship between the content of niobium and the denitrification rate in the exhaust gas treating catalyst, FIG. 4(a) showing a case where the temperature of the exhaust gas was 250° C., and FIG. 4(b) showing a case where the temperature of the exhaust gas was 300° C.
Figure 4B:
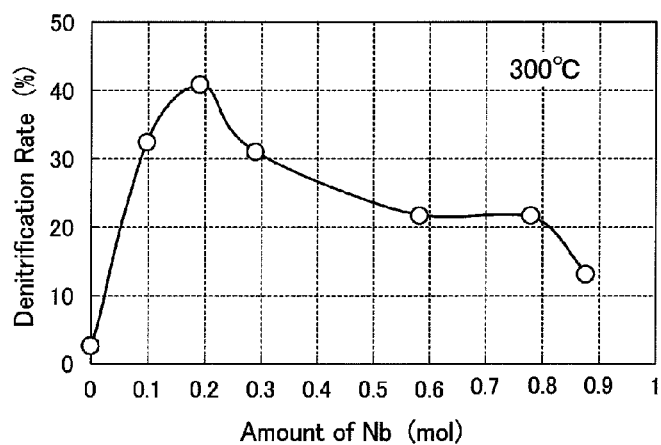

FIGS. 4(a) and 4(b) are graphs showing the relationship between the content of niobium and the denitrification rate in the exhaust gas treating catalyst, FIG. 4(a) showing a case where the temperature of the exhaust gas was 250° C., and FIG. 4(b) showing a case where the temperature of the exhaust gas was 300° C.

An exhaust gas treating catalyst $La_{0.7}Ba_{0.3}Fe_{0.97}Pd_{0.03}O_3$ with a niobium content of 0 mol, an exhaust gas treating catalyst $La_{0.7}Ba_{0.3}Fe_{0.873}Nb_{0.097}Pd_{0.03}O_3$ with a niobium content of 0.097 mol, an exhaust gas treating catalyst $La_{0.7}Ba_{0.3}Fe_{0.776}Nb_{0.194}Pd_{0.03}O_3$ with a niobium content of 0.194 mol, an exhaust gas treating catalyst $La_{0.7}Ba_{0.3}Fe_{0.679}Nb_{0.291}Pd_{0.03}O_3$ with a niobium content of 0.291 mol, an exhaust gas treating catalyst $La_{0.7}Ba_{0.3}Fe_{0.388}Nb_{0.582}Pd_{0.03}O_3$ with a niobium content of 0.582 mol, an exhaust gas treating catalyst $La_{0.7}Ba_{0.3}Fe_{0.194}Nb_{0.776}Pd_{0.03}O_3$ with a niobium content of 0.776 mol, and an exhaust gas treating catalyst $La_{0.7}Ba_{0.3}Fe_{0.097}Nb_{0.873}Pd_{0.03}O_3$ with a niobium content of 0.873 mol were each prepared by the aforementioned liquid phase process.

The exhaust gas was passed through each of the above-mentioned exhaust gas treating catalysts under the conditions shown in Table 1 above, and the denitrification performance of each catalyst was measured.

The results of the measurements are shown in FIGS. 4(a) and 4(b).

In FIGS. 4(a) and 4(b), the denitrification rate represents the average of the denitrification rate when the gas treated was in a lean state, and the denitrification rate when the gas treated was in a rich state.

When the exhaust gas temperature was 250° C., the exhaust gas treating catalyst $La_{0.7}Ba_{0.3}\{Fe_yNb_{(1-y)}\}_{0.97}Pd_{0.03}O_3$ with a Nb content (i.e., 0.97(1−y)) in the range of 0.050 mol or more, but 0.873 mol or less, preferably in the range of 0.10 mol or more, but 0.30 mol or less, was found to increase the denitrification rate as compared with the exhaust gas treating catalyst $La_{0.7}Ba_{0.3}Fe_{0.97}Pd_{0.03}O_3$ (Nb content: 0 mol), as shown in FIG. 4(a). Particularly, with the niobium content in the vicinity of 0.194 mol, an even higher denitrification rate was found to be shown.

When the exhaust gas temperature was 300° C., the exhaust gas treating catalyst $La_{0.7}Ba_{0.3}\{Fe_yNb_{(1-y)}\}_{0.97}Pd_{0.03}O_3$ with a Nb content (i.e., 0.97(1−y)) in the range of 0.050 mol or more, but 0.873 mol or less, preferably in the range of 0.10 mol or more, but 0.30 mol or less, was found to increase the denitrification rate as compared with the exhaust gas treating catalyst $La_{0.7}Ba_{0.3}Fe_{0.97}Pd_{0.03}O_3$ (Nb content: 0 mol), as shown in FIG. 4(b). Particularly, with the niobium content in the vicinity of 0.194 mol, an even higher denitrification rate was found to be shown.

As stated above, the exhaust gas treating catalyst according to the present invention is the exhaust gas treating catalyst containing the complex oxide represented by the general formula $ABO_3$, where the A-site is composed of a lanthanoid (La) and barium (Ba), and the B-site is composed of iron (Fe), niobium (Nb) and palladium (Pd). Because of these features, barium functions as a $NO_x$ storing agent, and niobium acts on palladium to accelerate NO oxidation and $NO_x$ reduction. Hence, this exhaust gas treating catalyst increases in the denitrification rate as compared with an exhaust gas treating catalyst containing a complex oxide composed of $LaFe_{0.95}Pd_{0.05}O_3$ which is a conventional complex oxide.

That is, palladium and niobium are incorporated into the B-site of the exhaust gas treating catalyst of the perovskite type represented by $ABO_3$. Thus, $NO_x$ desorption at the time of rich-switching is so low (the amount of $NO_x$ desorbing as such without being reduced by CO is so small) that the reaction between the stored NOx and CO(NOx reduction reaction, a reaction in the later stage of denitrification reaction) can be accelerated.

[Third Confirmatory Test]

The present confirmatory test is a test conducted to confirm the relationship between the denitrification rate by the exhaust gas treating catalyst having precious metals added thereto and the temperature of the exhaust gas.

The relationship between the denitrification rate by the exhaust gas treating catalyst having precious metals added thereto and the temperature of the exhaust gas will be described concretely by reference to FIG. 5.

Figure 5:
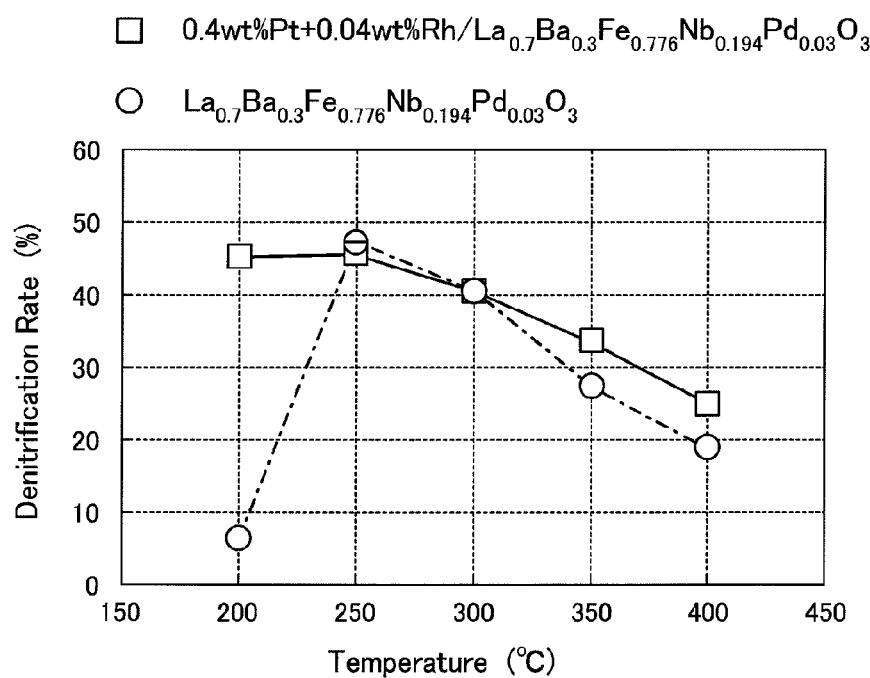
FIG. 5 is a graph showing the relationship between the denitrification rate by the exhaust gas treating catalyst and the temperature of the exhaust gas.

FIG. 5 is a graph showing the relationship between the denitrification rate by the exhaust gas treating catalyst and the temperature of the exhaust gas. In FIG. 5, squares represent the case of the exhaust gas treating catalyst having precious metals added thereto (0.4 wt. % Pt+0.04 wt. % $Rh/La_{0.7}Ba_{0.3}Fe_{0.776}Nb_{0.194}Pd_{0.03}O_3$), and circles represent the case of the exhaust gas treating catalyst having no precious metals added thereto ($La_{0.7}Ba_{0.3}Fe_{0.776}Nb_{0.194}Pd_{0.03}O_3$).

The exhaust gas treating catalyst having precious metals added thereto (0.4 wt. % Pt+0.04 wt. % $Rh/La_{0.7}Ba_{0.3}Fe_{0.776}Nb_{0.194}Pd_{0.03}O_3$), as Test Catalyst 1, and the exhaust gas treating catalyst having no precious metals added thereto ($La_{0.7}Ba_{0.3}Fe_{0.776}Nb_{0.194}Pd_{0.03}O_3$), as Comparative Test Catalyst 1, were each prepared by the aforementioned liquid phase process.

The exhaust gas was passed through each of the above-mentioned Test Catalyst 1 and Comparative Test Catalyst 1 under the conditions shown in Table 2 below, and the denitrification performance of each catalyst was measured. In Table 2, SV denotes space velocity (flow rate of fluid/volume of catalyst), and Lean/Rich represents the ratio of the treatment time in the lean state/the treatment time in the rich state.

TABLE 2

| Evaluation Conditions | | |
|---|---|---|
| SV | | 40000 $h^{-1}$, 200 to 400° C. |
| Lean Gas | NO | 500 ppm |
| (Base Gas: Ar) | CO | 300 ppm |
| | $CO_2$ | 6% |
| | $O_2$ | 10% |
| | $C_3H_6$ | 200 ppm |
| Rich Gas | NO | 500 ppm |
| (Base Gas: Ar) | CO | 4% |
| | $CO_2$ | 6% |
| | $O_2$ | 0% |
| | $C_3H_6$ | 200 ppm |
| Lean/Rich | | 56 seconds/4 seconds |

The results of the measurements are shown in FIG. 5.

In FIG. 5, the denitrification rate represents the average of the denitrification rate when the gas treated was in a lean state, and the denitrification rate when the gas treated was in a rich state.

As shown in FIG. 5, Test Catalyst 1 was found to provide a higher denitrification rate than Comparative Test Catalyst 1 over a range of 200° C. or higher, but 400° C. or lower. Test Catalyst 1 was also found to provide a denitrification rate comparable to that provided by Comparative Test Catalyst 1 at 250° C. Test Catalyst 1 was further found to show denitrification performance about 5 times as high as that of Comparative Test Catalyst 1 at 200° C.

[Fourth Confirmatory Test]

The present confirmatory test is a test conducted to confirm the relationship between the amounts of precious metals added to the exhaust gas treating catalyst and the denitrification rate by the exhaust gas treating catalyst.

The relationship between the amounts of precious metals added to the exhaust gas treating catalyst and the denitrification rate by the exhaust gas treating catalyst will be described concretely by reference to FIG. 6.

Figure 6:
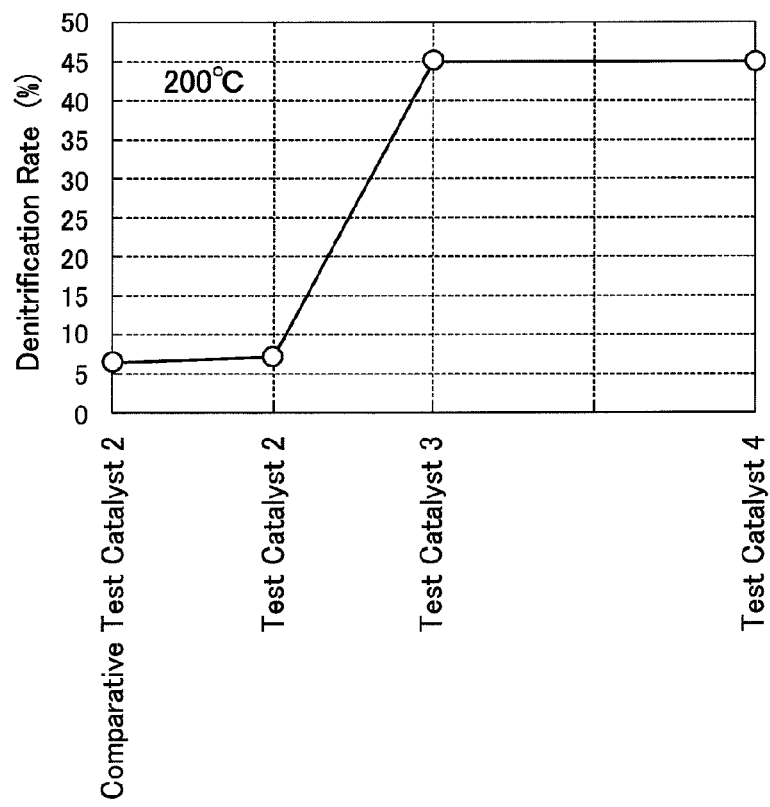
FIG. 6 is a graph showing the relationship between the amounts of precious metals added to the exhaust gas treating catalyst and the denitrification rate by the exhaust gas treating catalyst when the temperature of the exhaust gas was 200° C.

FIG. 6 is a graph showing the relationship between the amounts of precious metals added to the exhaust gas treating catalyst and the denitrification rate by the exhaust gas treating catalyst when the temperature of the exhaust gas was 200° C.

The exhaust gas treating catalyst having no precious metals added thereto ($La_{0.7}Ba_{0.3}Fe_{0.776}Nb_{0.194}Pd_{0.03}O_3$), as Comparative Test Catalyst 2, the exhaust gas treating catalyst having 0.1 wt. % platinum and 0.01 wt. % rhodium added thereto (0.1 wt. % Pt+0.01 wt. % Rh/$La_{0.7}Ba_{0.3}Fe_{0.776}Nb_{0.194}Pd_{0.03}O_3$), as Test Catalyst 2, the exhaust gas treating catalyst having 0.2 wt. % platinum and 0.02 wt. % rhodium added thereto (0.2 wt. % Pt+0.02 wt. % Rh/$La_{0.7}Ba_{0.3}Fe_{0.776}Nb_{0.194}Pd_{0.03}O_3$), as Test Catalyst 3, and the exhaust gas treating catalyst having 0.4 wt. % platinum and 0.04 wt. % rhodium added thereto (0.4 wt. % Pt+0.04 wt. % Rh/$La_{0.7}Ba_{0.3}Fe_{0.776}Nb_{0.194}Pd_{0.03}O_3$), as Test Catalyst 4, were each prepared by the aforementioned liquid phase process.

The exhaust gas was passed through each of the above-mentioned Comparative Test Catalyst 2, Test Catalyst 2, Test Catalyst 3 and Test Catalyst 4 under the conditions shown in Table 3 below, and the denitrification performance of each catalyst was measured. In Table 3, SV denotes space velocity (flow rate of fluid/volume of catalyst), and Lean/Rich represents the ratio of the treatment time in the lean state/the treatment time in the rich state.

TABLE 3

| Evaluation Conditions | | |
|---|---|---|
| SV | | 40000 h$^{-1}$, 200° C. |
| Lean Gas | NO | 500 ppm |
| (Base Gas: Ar) | CO | 300 ppm |
| | $CO_2$ | 6% |
| | $O_2$ | 10% |
| | $C_3H_6$ | 200 ppm |
| Rich Gas | NO | 500 ppm |
| (Base Gas: Ar) | CO | 4% |
| | $CO_2$ | 6% |
| | $O_2$ | 0% |
| | $C_3H_6$ | 200 ppm |
| Lean/Rich | | 56 seconds/4 seconds |

The results of the measurements are shown in FIG. 6.

In FIG. 6, the denitrification rate represents the average of the denitrification rate when the gas treated was in a lean state, and the denitrification rate when the gas treated was in a rich state.

When the exhaust gas temperature was 200° C., Test Catalysts 2, 3 and 4 were found to increase the denitrification rate in comparison with Comparative Test Catalyst 2, as shown in FIG. 6. That is, by setting the amount of the precious metals added to the exhaust gas treating catalyst ($La_{0.7}Ba_{0.3}Fe_{0.776}Nb_{0.194}Pd_{0.03}O_3$) at 0.11 wt. % or more, the denitrification rate was found to be increased as compared with the exhaust gas treating catalyst containing no precious metals ($La_{0.7}Ba_{0.3}Fe_{0.776}Nb_{0.194}Pd_{0.03}O_3$). Particularly when the amount of the precious metals contained in the exhaust gas treating catalyst ($La_{0.7}Ba_{0.3}Fe_{0.776}Nb_{0.194}Pd_{0.03}O_3$) was in the range of 0.22 wt. % or more, but 0.44 wt. % or less, it was found that a denitrification rate of about 45% was shown.

The exhaust gas treating catalyst according to the present invention is an exhaust gas treating catalyst further containing at least one precious metal among Pt, Rh, Ir and Ru in addition to a complex oxide composed of $La_xBa_{(1-x)}\{Fe_yNb_{(1-y)}\}_{(1-z)}Pd_zO_3$. In comparison with an exhaust gas treating catalyst having a complex oxide free of this precious metal, such an exhaust gas treating catalyst can exhibit denitrification performance comparable to that of an exhaust gas treating catalyst not containing at least one precious metal among Pt, Rh, Ir and Ru, over an exhaust gas temperature range of 250 to 400° C., and even at the exhaust gas temperature of 200° C., can show denitrification performance comparable to that shown when the temperature of the exhaust gas was 250° C. Thus, the compactness of the exhaust gas treating catalyst can be achieved.

The present invention has been described above using the exhaust gas treating catalyst prepared by the liquid phase process. However, the exhaust gas treating catalyst prepared by the solid phase process can also be adopted. Even such an exhaust gas treating catalyst prepared by this technique shows the same actions and effects as those of the above-described exhaust gas treating catalyst.

DESCRIPTION OF REFERENCE NUMERALS

10, 30 Exhaust gas purification apparatus, 11 DPF, 12 Exhaust gas treating catalyst, 31 Oxidation catalyst, 20, 21, 40, 41 Exhaust gas

The invention claimed is:

1. An exhaust gas treating catalyst for reducing nitrogen oxides in an exhaust gas to purify the exhaust gas, the exhaust gas treating catalyst containing a complex oxide represented by a general formula ABO3, where the A-site is composed of a lanthanoid (La) and barium (Ba), the B-site is composed of iron (Fe), niobium (Nb), and palladium, and fulfills $\{La_xBa_{(1-x)}\}\{Fe_yNb_{(1-y)}\}_{(1-z)}Pd_zO_3$, where x is in a range of more than 0.30, but 0.95 or less, y is in a range of 0.07 or more, but 0.94 or less, and z is in a range of 0.01 or more, but 0.10 or less, and the complex oxide has such a structure that the barium functions as a NOx storing agent, and the niobium act on the palladium to accelerate NO oxidation and NOx reduction.

2. The exhaust gas treating catalyst according to claim 1, where x is in a range of more than 0.60, but less than 0.80, y is in a range of 0.63 or more, but 0.88 or less, and z is in a range of 0.02 or more, but 0.04 or less.

3. The exhaust gas treating catalyst according to claim 1, further containing at least one additional precious metal (PM2) comprising Pt, Rh, Ir and Ru, other than palladium (Pd) and fulfills PM2/-{LaxBa(1−x)} {FeyNb(1−y)}(1−z)PdzO3.

4. The exhaust gas treating catalyst according to claim 3, wherein the at least one precious metal is contained in an amount of 0.1 wt. % or more based on the complex oxide.

5. An exhaust gas purification method for reducing nitrogen oxides in an exhaust gas containing nitrogen oxides to purify the exhaust gas, the method comprising:

in a temperature range of 200° C. to 400° C., adjusting the exhaust gas between a lean state where the exhaust gas has a low concentration of carbon monoxide and a high concentration of oxygen and a rich state where the exhaust gas as a high concentration of carbon monoxide and a low concentration of oxygen; and bringing the exhaust gas into contact with an exhaust gas treating catalyst containing a complex oxide represented by $$\{La_xBa_{(1-x)}\}\{Fe_yNb_{(1-y)}\}_{(1-z)}Pd_zO_3,$$

where x is in a range of more than 0.30, but 0.95 or less, y is in a range of 0.07 or more, but 0.94 or less, and z is in a range of 0.01 or more, but 0.10 or less. or more, but 0.94 or less, and z is in a range of 0.01 or more, but 0.10 or less.

6. The exhaust gas treating catalyst according to claim 5, wherein as the exhaust gas treating catalyst, the method uses an exhaust gas treating catalyst represented by $\{La_xBa_{(1-x)}\}\{Fe_yNb_{(1-y)}\}_{(1-z)}Pd_zO_3$, where x is in a range of more than 0.60, but less than 0.80, y is in a range of 0.63 or more, but 0.88 or less, and z is in a range of 0.02 or more, but 0.04 or less.

* * * * *